United States Patent [19]

Gardner

[11] Patent Number: 6,058,391
[45] Date of Patent: May 2, 2000

[54] ENHANCED USER VIEW/UPDATE CAPABILITY FOR MANAGING DATA FROM RELATIONAL TABLES

[75] Inventor: Jonathan Gardner, Wylie, Tex.

[73] Assignee: MCI Communications Corporation, Washington, D.C.

[21] Appl. No.: 08/992,048

[22] Filed: Dec. 17, 1997

[51] Int. Cl.[7] .................................................. G06F 17/30
[52] U.S. Cl. ................................... 707/4; 705/26; 707/3; 707/4; 707/10; 707/100; 707/102
[58] Field of Search ............................ 707/1–3, 8, 103, 707/200, 4, 10, 100, 102; 705/26

[56] References Cited

U.S. PATENT DOCUMENTS

| | | | |
|---|---|---|---|
| 5,388,255 | 2/1995 | Pytlik et al. | 707/4 |
| 5,630,116 | 5/1997 | Takaya et al. | 707/201 |
| 5,675,785 | 10/1997 | Hall et al. | 707/102 |
| 5,787,416 | 7/1998 | Tabb et al. | 707/2 |
| 5,809,497 | 9/1998 | Freund et al. | 707/2 |
| 5,893,087 | 4/1999 | Wlaschin et al. | 707/3 |
| 5,893,125 | 4/1999 | Shostak | 707/511 |
| 5,903,753 | 5/1999 | Bramnick et al. | 395/680 |
| 5,974,418 | 10/1999 | Blinn et al. | 707/100 |

OTHER PUBLICATIONS

Jensen, C. S. et al., "Incremental implementation model for databse with transaction time", IEEE Transaction on Knowledge and Data Engineering, vol. 3, Issue: Dec. 4, 1991, pp 461–473.

Lee, Byung Suk et al., "Outer joins and filters and instantiating objects from relational database through views", IEEE Transaction on Knowledge and Data Engineering, vol. 6, Issue: Feb. 1, 1994, pp 108–119.

*Primary Examiner*—Jack M. Choules
*Assistant Examiner*—Shahid Alam

[57] ABSTRACT

A system and method for creating customizable views of a database so that database users may view and update tables in a manner that requires no knowledge of the underlying database schema or of the database commands. The system includes a view database and a view/update utility. The view database includes database tables for associating a relational table with a particular view and for associating one or more fields of the relational table with the view. The view/update utility utilizes the view database in performing the processes of creating, displaying, and updating views.

19 Claims, 17 Drawing Sheets

Company Database 100

Employee Table 102

| employee_id | employee_name | title | salary | department_id |
|---|---|---|---|---|
| 1 | "John" | "Vice President" | 100,000 | 100 |
| 2 | "Mary" | "Manager" | 60,000 | 200 |
| 3 | "Eric" | "Sales Director" | 75,000 | 300 |
| 4 | "Mark" | "Sales Associate" | 45,000 | 300 |
| 5 | "Jennifer" | "Engineer" | 30,000 | 100 |

Department Table 104

| department_ID | department_name | department_budget | number_of_employees |
|---|---|---|---|
| 100 | "Engineering" | $100,000 | 50 |
| 200 | "Marketing" | $50,000 | 30 |
| 300 | "Sales" | $75,000 | 10 |

View database 214

Table_Link 502

| view_id | table_name | primary_key | view_description | default_filter_id |
|---|---|---|---|---|
| 1 | "Employee table" | "employee_id" | "Employee Salary View" | 1 |
| 2 | "Department table" | "department_id" | "Department/Budget View" | N/A |

FIG. 5A

Table_View 504

| table_view_id | view_id | field_name | lookup_yn | lookup_table | lookup_field | look_up_alias | display_field | field_title | read-only_yn | display_order | auto_gen_y/n |
|---|---|---|---|---|---|---|---|---|---|---|---|
| 1 | 1 | "employee_name" | no | N/A | N/A | N/A | N/A | "Name of employee" | yes | 1 | no |
| 2 | 1 | "salary" | no | N/A | N/A | N/A | N/A | "Salary" | yes | 2 | no |
| 3 | 1 | "department_id" | yes | "Department" | "department_id" | N/A | "department_name" | "Department Name" | yes | 3 | yes |
| 4 | 2 | "department_name" | no | N/A | N/A | N/A | N/A | "Department Name" | yes | 1 | no |
| 5 | 2 | "department_budget" | no | N/A | N/A | N/A | N/A | "Budget" | yes | 2 | no |

FIG. 5B

Group_View 506

| group_view_id | admin_group_id | view_id |
|---|---|---|
| 1 | "admin group 1" | 1 |
| 2 | "admin group 2" | 1 |
| 3 | "admin group 3" | 1 |
| 4 | "admin group 1" | 2 |
| 5 | "admin group 3" | 2 |

FIG. 5C

Filter_Link

| filter_id | filter_name | view_id | default_filter_yn | operator_id |
|---|---|---|---|---|
| 1 | Salary Filter | 1 | yes | OR |

Filter_Set

| filter_id | filter_set_name | operator_id |
|---|---|---|
| 1 | condition_set_1 | AND |
| 1 | condition_set_2 | AND |

Filter_Condition

| filter_condition_id | filter_set_id | sql_condition_statement | table_view_id | operator | value1 | value2 |
|---|---|---|---|---|---|---|
| 1 | 1 | salary > 50,000 | 2 | > | 50,000 | N/A |
| 2 | 1 | department = engineering | 3 | = | engineering | N/A |
| 3 | 2 | salary > 60,000 | 2 | > | 60,000 | N/A |
| 4 | 2 | department = sales | 2 | = | sales | N/A |

FIG. 5D

Employee Salary View

| Name of Employee | salary | Department Name |
|---|---|---|
| John | $100,000 | "Engineering" |
| Eric | $75,000 | "Sales" |

FIG. 6A

Department/Budget View

| Department Name | Annual Budget |
|---|---|
| Engineering Department | $100,000 |
| Marketing | $50,000 |
| Sales | $75,000 |

FIG. 6B

ENHANCED USER VIEW/UPDATE CAPABILITY FOR MANAGING DATA FROM RELATIONAL TABLES

BACKGROUND OF THE INVENTION

1. Field of the Invention

The present invention relates to a system and method for viewing and updating tables of a relational database and, in particular, to a system and method for creating customizable views of a relational database so that the database users may view and update select subsets of the database tables in a manner that requires no knowledge of the underlying database schema or database commands.

2. Related Art

A relational database is database that consists entirely of tables. A table is a collection of rows, where each row is comprised of one or more fields. The rows of a table are also called records and the fields of a row are also called columns. An example relational database is illustrated in FIG. 1. The relational database of FIG. 1 is a database that could be used by any business organization that wants to keep track of employee and department data.

As can be seen from FIG. 1, the database contains two tables: an Employee table, which is used for storing useful information concerning all of the employees in the organization; and a Department table. Each record (i.e., row) in the Employee table contains information about a particular employee. These records will be called "employee records." As can be seen from FIG. 1, each employee record contains five fields of employee information. These fields are: employee id, employee name, title, salary, and department id. Similarly, each record in the Department table contains information about a particular department. For example, the first record in the Department table contains information concerning the Engineering department. Each department record contains four fields. These fields are: department id, department name, manager, budget, and number of employees.

Records in different tables of a relational database may be logically linked by what is called a "lookup field." A lookup field (also sometimes called a foreign key) is a field that is common to two or more tables and is a primary key in one of the tables. The table that has the lookup field as its primary key is called the lookup table.

In the example of FIG. 1, the department_id field is a lookup field since it is common to both the employee table and department table, and it is a primary key in the department table. The reason it is called a lookup field is that the value that is stored in the department_id field of an Employee record does not contain information that is immediately meaningful to a user, rather the department_id field of an Employee record contains a value that allows a user to perform a "lookup" in the Department table so that the user may retrieve information that does have meaning to the user.

This is best understood by example. Consider a user that wants to determine the department that a particular employee works in; that user would first access the Employee table to retrieve the employee record for that particular employee. Unfortunately for that user, the employee record does not contain the name of the department the employee works in, rather the employee record merely contains a department ID, which is stored in the department_id field. Consequently, for the user to determine the name of the department, the user would perform a "lookup" in the Department table (i.e., the lookup table) for a department record that contains a department ID value that matches the department ID value from the employee record. Once a matching record is found, the user can retrieve the matching department record to get the name of the department that is associated with the department ID stored in the employee table from the department_name field of the Department table. The department_name field of the Department table is called the "display field", since it contains the information that the user would prefer to have displayed. In other words, the department_name field contains the actual name of a department as opposed to merely an integer value used for uniquely identifying a department record within the Department table, which is what is stored in the department_id field. Lookup fields, such as the department_id field, are useful in that they allow all of the information relating to a department to exist in the department table, while logically linking an employee with a department.

One problem with lookup fields, however, is that lookup fields, such as the department_id field, make the database appear complex from a user's perspective. In particular, viewing and updating the database becomes more difficult when lookup fields are used. For example, as described above, if a user wanted to find out what department an employee worked in, the user would have to employ a two step process: first, the user would have to go to the employee table and find the employee the user was interested in; second, the user would have to use the department ID stored for that employee and then go to the department table to determine the name of the department associated with that department ID. Consequently, a user must preform two lookups in two separate tables in order to view all the relevant employee information. This might not be a problem if the user is familiar with the database and knows the commands to operate the database. However, many database users are not aware of the underlying structure of the database nor are they familiar with the database command language.

Updating a database that contains lookup fields also presents problems to a user who is not familiar with the structure of the database. For example, if a user of the database wants to update the database to reflect the fact that employee "John" has moved from the engineering department to the marketing department, the user would have to update the department_id field in the employee table so that it contains the marketing id (i.e., 200) rather than the engineering id (i.e., 100). The user, therefore, would have to know the department identification for the marketing department. To determine the department id for the marketing department, the user would have to do a search of the Department table. Consequently, what appears to be a simple update actually requires two steps. The first step being a search of the department database, and the second step being an update of the employee table. Again, this might not be a problem if the user is familiar with the database and knows the commands to operate the database. However, as was stated above, many database users are not aware of the underlying structure of the database nor are they familiar with the database command language.

Another problem encountered with relational databases is that most tables contain a set of information that is of no value to certain users. For example, there are users who may be interested in accessing information concerning only a subset of all the employees. In particular, the manager of the Engineering department is only interested in accessing the Employee table to retrieve information concerning the employees that work in the engineering department; the remainder of the information in the Employee table having no value to the engineering manager. Consequently, if the engineering manager were to access the database and view the entire Employee table, the manager would be presented with more information than is needed, and the manager would have to spend valuable time sifting through the table to find what he is looking for.

Another problem encountered with relational databases is that any given table usually contains information that should not be accessed by certain users. For example, only a limited number of users should be given the capability to view and/or update salary information of an employee.

One solution to the problems described above is to create a database having several tables without any lookup fields, and then limit access to each table. For example, there could be a separate "Employee Salary" table that may be accessed only by a select group of users who have the authority to view employee salary information, or there could be a separate Employee table for each department within the company so that the manager of each respective department will only have access to the tables pertaining to their department. The disadvantage of using this approach is that it is less efficient, creates a complex database structure, and increases the difficulty in maintaining database integrity.

A second solution is to have the user learn and become an expert in the use of SQL (structured query language). SQL is the command language of relational database systems. When a user wants to retrieve or update information in a relational database, the user would create a SQL command to perform the task. If a user were expert in SQL, the user could select certain portions of a table to view. The drawback with this approach is the time and effort that is needed to learn SQL, and there would be nothing to stop a user from viewing/updating information that he is not allowed to view or update.

Another approach is to have a computer programmer design a custom application that will hide the intricacies of the database from the user. This approach is an improvement over having the user learn SQL. The disadvantage to this approach, however, is that changes to the structure of the database will necessitate changes to the custom application. Similarly, if a user's requirements change or a new group of users want their own view of the database, the custom application will have to be modified.

What is needed is a system that solves the problem caused by lookup fields, and allows a user to easily retrieve only those records and fields of a table that are of interest to the user, without requiring the user to invest time and effort in learning SQL, and without the user having to know the underlying structure of the database. Furthermore, the application must be flexible enough so that an administrator can easily create custom designed views for different groups of users who have different viewing and updating requirements of the same table. Lastly, changes to the database structure or changes in a user's requirements should not necessitate changes to the application.

SUMMARY OF THE INVENTION

The present invention provides a system and method for enabling a user who is unfamiliar with SQL to easily retrieve and modify information in a relational database. The invention accomplishes this by providing a system and method by which a database administrator can easily create and save custom designed "views" of tables within the relational database.

A "view" is created simply by having an administrator enter view information into the system. The system provides an easy to use graphical user interface (GUI) for performing this task. The view information entered by an administrator includes the name of a table within the relational database that is to be associated with the view and the names of the columns from that table that are to be included in the view. The view administrator can also specify the column titles that will be displayed to a user, the display order of columns within the view, and whether a column is to be read-only. The invention also provides a mechanism for the administrator to specify that only certain records of the table associated with the view meeting a specific criteria shall be included in the view. This type of specification is called a filter.

Additionally, a feature of the invention is that the administrator is given the ability to assign a particular user or group of users to one or more views. Thus, each user or group of users can have their own unique views of the database.

Database users are given access to the stored views through a view utility. To retrieve information from the relational database, the user simply uses the view utility to select a view from among the views assigned to the user. Upon a user selecting a view, the view utility creates a SQL database command to retrieve the information in the relational database that corresponds to the selected view. The retrieved information is then presented to the user in the form of a table.

Since the utility creates the SQL command for accessing the relational database, the user need not be proficient in SQL to view the portions of the database that are of interest to the user. In fact, the user need not know anything about SQL, the user need only know how to operate the utility to select a view that has been saved in the view database.

From the user's perspective, a view is simply a table of information; the table of information consisting of a subset of one of the actual database tables (hereafter referred to as the "base table") and of display data associated with a lookup field. Shown below is a view named "Salary Information," which is a view of the Employee table shown in FIG. 1.

| Salary Information | | |
| --- | --- | --- |
| Employee Name | Department | Salary |
| John | Engineering | $100,000 |
| Mary | Marketing | $60,000 |
| Eric | Sales | $75,000 |
| Mark | Sales | $45,000 |
| Jennifer | Engineering | $30,000 |

"Salary Information" is a virtual table comprising a subset of the information stored in the Employee table. Specifically, the "Salary Information" view comprises only the employee_name column, department_id column, and salary column of the Employee table. It should be noted that, even though the Employee table only contains department IDs, the "Salary Information" view shows the actual department name and not the department ID for each employee. The Salary Information view shows the department name and not the department ID because the department name is the display data associated with the department_id lookup field of the Employee table.

The system and method of the present invention provide an administrator with a great deal of flexibility in defining views to meet a user's needs. The system provides an administrator with the ability to not only define the subset of columns of a particular base table that comprise the view, but also which records of the base table should be included in the view. The invention accomplishes this by allowing an administrator to specify that only those records that meet a certain criteria should be included in the view. This type of specification is called a filter. For example, in addition to specifying that the Salary Information view shall include only the employee name column, department_id column, and salary column of the Employee table, an administrator may create a filter that specifies that the Salary Information view shall include only those records of the Employee table that contain a value in their salary field that exceeds $50,000. Shown below is a representation of the Salary Information view according to the above specification.

| Salary Information | | |
|---|---|---|
| Employee Name | Department | Salary |
| John | Engineering | $100,000 |
| Mary | Marketing | $60,000 |
| Eric | Sales | $75,000 |

Additionally, when defining a view, the administrator has the ability to specify the display order of the fields that comprise the view, whether a field in the view should be read-only, the column titles to be displayed, and whether a given field in the view is a lookup field. If a given field is a lookup field, then the administrator will specify the look up table and the display field that contain the display data that will be displayed to a user. This specification allows the system of the present invention to automatically map the values stored in lookup fields into more meaningful information for the user.

Another feature of the invention is that all views are updatable. That is, a user can modify the information displayed to the user and the utility will create the database commands to update the appropriate tables in the relational database corresponding to the modifications.

A further feature of the invention is that the invention supports two types or levels of administrators. A level one administrator only has the ability to modify existing views. A level two administrator can create new views and delete existing views, as well as modify existing views.

With all of the features supported by the present invention, an administrator has a great deal of flexibility in creating custom designed views to meet a variety of user needs. Additionally, the system of the present invention is self configurable such that changes to the database structure do not require any changes to the computer application underlying the system. In other words, if the database structure changes, then only the view definitions need to be changed and not the underlying computer application.

The system of the present invention has two components: a view database that is used for storing view definitions, and a view utility (i.e., a computer program) that interfaces with a user or administrator, the view database, and an application database. The application database is the relational database that contains the base tables.

The view utility includes an easy to use graphical user interface for allowing an administrator to create and save new views, modify existing views, and select existing views for viewing and/or updating. The view utility also includes program logic for retrieving views from the view database, translating the view definitions stored in the view database into SQL commands, issuing the SQL commands to the database, and capturing the results of the SQL commands for display to a user. The view utility will display the results of the SQL command in the GUI, and depending on whether the user has update privileges, the user will be able to edit what is displayed in the GUI. After making the desired edits to the data displayed, the user will signal the utility to update the database according to the modifications the user made to the view. The utility will then update the appropriate tables in the database.

Further features and advantages of the present invention, as well as the structure and operation of various embodiments of the present invention, are described in detail below with reference to the accompanying drawings.

BRIEF DESCRIPTION OF THE FIGURES

The foregoing and other features and advantages of the present invention will be apparent from the following, more particular description of a preferred embodiment of the invention, as illustrated in the accompanying drawings.

FIG. 1 illustrates an example relational database comprising two tables.

FIG. 3 illustrates three GUI screens used by the present invention.

FIGS. 5A–D illustrate an example of the view database where two views of the Company Database of FIG. 1 have been defined.

FIGS. 6A–B illustrate the two example views defined in the view database illustrated in FIGS. 5A–D.

DETAILED DESCRIPTION OF THE PREFERRED EMBODIMENTS

The present invention enables an administrator to create "views" of any tables of any relational database, to assign a particular user to one or more views, and allows a user to select a view for displaying and updating. A view is a virtual table, i.e., a table that is does not exist in its own right but looks to the user as if it did. A view is defined by the following information:

(1) a view name;

(2) the name of the base table associated with the view;

(3) the primary key of the base table;

(4) a default filter;

(5) the names of the fields within the base table that are to be included in the view;

(6) the attributes of those fields included in the view; and (7) an administrative group to which the view belongs.

The attributes of a field included in the view consist of:

(1) the field's read-only status;

(2) the field's auto-generated status;

(3) the field's title to be displayed to the user;

(4) the field's display order;

(5) the field's lookup status; and (6) the lookup_table, lookup_field, lookup alias and display field if the field is a lookup field.

Figure 2:
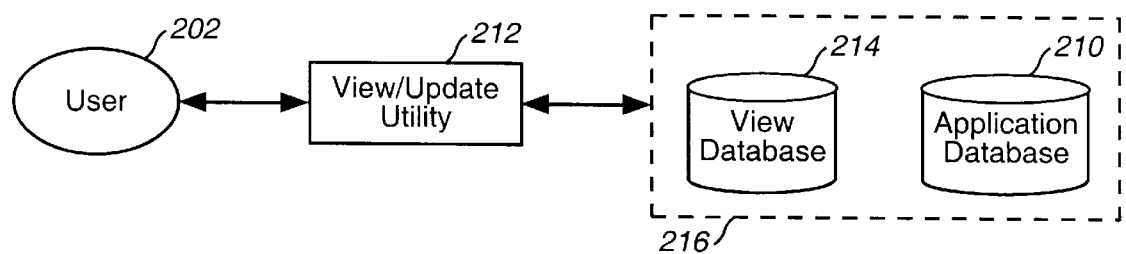
FIG. 2 illustrates the components of the present invention.

FIG. 2 illustrates, at a high level, the components of the present invention that enable an administrator to create views and store them for later retrieval. The present invention comprises a view utility 212 (hereafter referred to as "utility"), a view database 214, and an application database 210. It should be noted that the view database 214 and the application database 210 need not be separate databases. The tables of the view database 214 can be combined with the tables of the application database to form a single database schema 216. For clarity, the view database 214 and the application database 210 are illustrated as separate databases.

The utility 212 is a computer software application capable of executing on a wide variety of platforms and capable of interfacing with a relational database. Development of the utility 212 is not limited to any particular programming language. The utility 212 is programmed to perform a number of operations, such as: creating a view, displaying a view, and updating a view. The procedures for performing these operations will be described with reference to FIGS. 7–9. FIG. 10 illustrates the computer system in which the utility 212 will operate. Not shown in FIG. 10 are the common input and output devices, such as a keyboard, mouse and display, which are well known to one skilled in the art.

The utility 212 includes a graphical user interface (GUI) that a user/administrator interacts with to create and select views. The administrator creates a view by inputting view information into data input fields of the GUI. The utility 212 takes the information entered by the administrator and stores it into the view database 214 for later retrieval. The view database 214 will be described with reference to FIG. 4. The GUI also provides a view selection screen for allowing a user to select a view that has been stored in the view database 214. After the user selects a view from the view database 214, the utility 212 extracts the view information from the database and uses it to create a SQL command. The utility 212 then executes the SQL command and displays the results to the user in a table format. The table displayed to the user contains only the fields and records of the base table that are included in the view.

View database 214 is a relational database in the preferred embodiment of the present invention. View database 214 is used as a means to store view definitions that have been created by an administrator.

Figure 4:
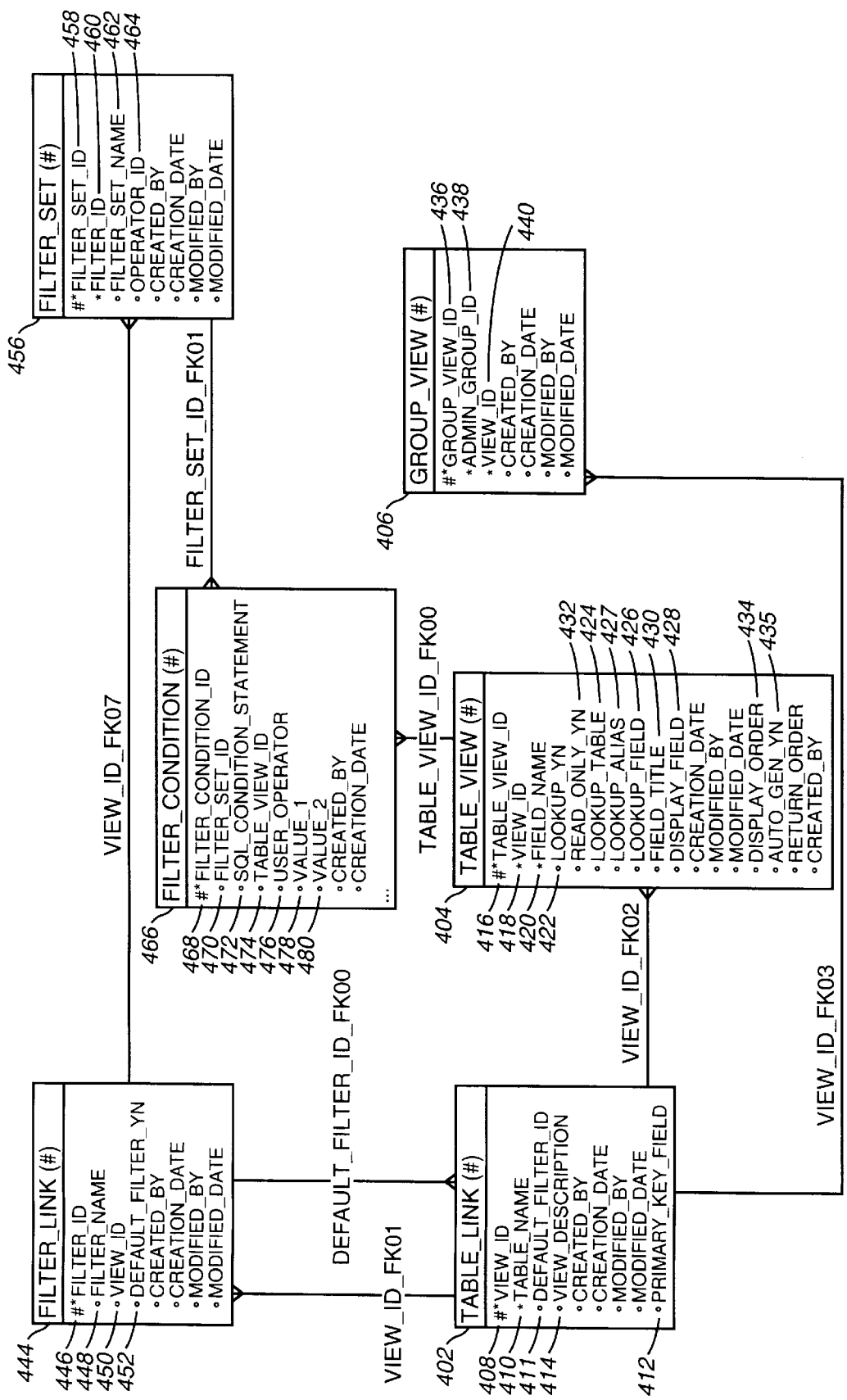
FIG. 4 illustrates the tables that comprise the view database.

FIG. 4 illustrates the components of view database 214. As shown in FIG. 4, view database 214 comprises the following six tables: (1) Table_Link 402; (2) Table_View 404; (3) Group_View 406; (4) Filter_Link 444; (5) Filter_Set 456; and (6) Filter_Condition 466.

Table_Link 402 comprises the following five fields: (1) view_id 408; (2) table_name 410; (3) primary_key 412; (4) view_description 414; and (5) default_filter_id 411. The view_id field 408 stores a system generated unique view identifier. The table_name field 410 is used for storing the name of the base table that is associated with the view. The primary key field 412 is used to store the name of the primary key of the base table. The view description field 414 is used to store the name for the view. Finally, the default_filter_id 411 is used to store the filter ID of the default filter associated with a view. Filter will be described in more detail below.

Table_View 404 includes the following twelve fields: (1) table_view_id 416; (2) view_id 418; (3) field_name 420; (4) lookup_yn 422; (5) lookup_table 424; (6) lookup_field 426; (7) lookup_alias; (8) display_field 428; (9) field_title 430; (10) read_only_yn 432; (11) display_order 434; and (12) auto_gen_yn 435.

Table_View table 404 is used for storing the names of all the fields within the base table that are to be included in a particular view. It is able to accomplish this since each record in the table contains a view_id field 418 and a field_name field 420. Consequently, each record of the table links a field from the base table with a particular view identifier.

Table_View 404 is also used for storing the attributes of the fields that are associated with a view. It is able to accomplish this since each record in Table_View 404 contains nine fields corresponding to the nine field attributes that are associated with each field from the base table that is included in the view. Specifically, the nine fields are: (1) lookup_yn 422; (2) lookup_table 424; (3) lookup_field 426; (4) lookup_alias; (5) display_field 428; (6) field_title 430; (7) read_only_yn 432; (8) display order 434; and (9) auto_gen_yn 435. Lookup_yn 420 is used for storing a yes/no value for indicating weather the field stored in the field_name field 420 is a lookup field. If it is, then lookup_table 424 will store the name of the lookup table or an alias, lookup_field 426 will store the name of the lookup field as it appears in the lookup table, lookup_alias 427 will contain the true name of the lookup_table if an alias name is stored in lookup_table 424, and display_field 428 will store the name of the field in the lookup table whose contents will be displayed to the user instead of displaying the contents of the lookup field. Field_title 430 is used for storing the field title that will be displayed to the user in the view. Read_only_yn 432 is used for storing a yes/no value indicating whether this field in the view will be read only. Display_order 434 is used for storing the display order of the field, i.e., which column of the view will contain the field. Lastly, auto_gen_yn 435 is used for storing a yes/no value indicating whether the field is a primary key that should be automatically generated by the system.

Tables Filter_Link 444, Filter_Set 456, and Filter_Condition 466 are used for storing the filters associated with a view. A filter is a mechanism for enabling a user to specify the records contained in the base table that should be excluded (i.e., filtered) from the view. For example, a user can create a view of the Employee table of FIG. 1 and create a filter for that view where the filter excludes from the view all employees who earn less than a certain dollar amount.

A filter consists of one or more condition sets, where, if there is more than one condition set, all of the condition sets are linked by either the AND or OR boolean operator. A condition set consists of one or more conditions, where, if there is more than one condition, all of the conditions are linked by either the AND or OR boolean operator.

A condition has three parameters: (1) the name of one of the fields that have been added to the view; (2) an operator; and (3) a user defined value or values. Two example conditions would be: (1) "salary>$50,000", and (2) "department=engineering." An example of a condition set would be the two conditions described above linked by a boolean operator. For example, a valid condition set would be: ("salary>$50,000 AND department=engineering.")

As stated above, a filter consists of one or more condition sets linked by a boolean operator. For example, a valid filter would be: "(salary>$50,000 AND department=engineering) OR (salary>$60,000 AND department=sales)." The filter in the preceding example consists of two conditions sets linked by the boolean operator OR. Each condition set is evaluated independently and then the filter is evaluated.

Because a filter is composed of condition sets and condition sets are composed of conditions, the view database 214 contains three tables for storing filter information. The first table is the Filter_Link 444 table. This table links a filter with a view, and contains the following fields: filter_id 446; filter_name 448; view_id 450; default_filter_y/n 452; and operator_id 454. Filter_id 446 is used for storing a system generated unique filter ID, which is used by the system to uniquely identify the filter; filter_name 448 is used for storing the name of the filter entered by the user; view_id 450 is used for storing a view ID, which links a view with the filter; default_filter_y/n 452 is used for storing a yes/no value for determining whether the named filter is a default filter; and operator_id 454 is used for storing an operator ID for specifying the boolean operator that is to link the condition sets that comprise the filter.

The second table is the Filter_Set table 456. This table links condition sets with a filter ID, and contains the following fields: filter_set_id 458; filter_id 460; filter_set_name 462; and operator_id 454. Filter_set_id 458 is used for storing a system generated filter condition set ID. Filter_id 460 is used for storing the filter ID of the filter to which the condition set belongs, thereby linking the condition set with a filter. Filter_set_name 462 is used for storing a name for the condition set. Operator_id 454 is used for storing an operator ID for specifying the boolean operator that is to link the conditions that comprise the condition set.

The last table is the Filter_Condition table 466. This table links conditions to a condition set, and contains the following fields: filter_condition_id 468; filter_set_id 470; sql_condition_statement 472; table_view_id 474; user_operator 476; value_1 478; and value_2 480. Filter_condition_id 468 is used for storing a system generated filter condition id. Filter_set_id 470 is used for storing the filter condition set ID of the condition set to which the condition belongs. Sql_condition_statement 472 is used for storing a condition statement. Table_view_id 474 is used for storing the table view ID of the field that is part of the condition statement. User_operator 476 is used for storing a condition operator. Value_1 478 is used for storing a first user defined value. Value_2 480 is used for storing a second user defined value.

The Group_View table 406 is used to control which groups of users will have access to a particular view. Each user of the utility 212 belongs to at least one of many administrative groups. The Group_View table 406 is used to link one or more views with each administrative group. By associating one or more views with each administrative group, the system has a means for assigning one or more views to a user or group of users. That is, a user may only have access to views that are associated with the administrative group(s) to which the user belongs.

Group_View table 406 comprises the following fields: group view_id 436; admin_group_id 438; and view_id 440. Group_view_id 436 is used for storing a unique system generated primary key for Group_View 406. Admin_group_id 438 is used for storing the identifier of an administrative group. View_id 440 is used for storing the view identifier that is to be linked to the administrative group that has access to the view. Given this table schema, every row of Group_View 406 associates a particular view with a particular administrative group. Consequently, one or more views can be associated with each administrative group thereby providing means for limiting a user's access to a specified set of views.

Additionally, as shown in FIG. 4, each table in the view database includes the following fields: created_by; creation_date; modified_by; and modification_date. These fields are used to store the creation date and last modification date of each row, and who created and last modified each row. As should be readily apparent to one skilled in the art, other fields an be added to any of the tables as required.

FIGS. 5A,B&C illustrate an example of the view database 214 where two views of the Company Database 100 have been defined. As illustrated in FIG. 1, the Company Database 100 is a relational database comprising two tables, the Employee table 102 and the Department table 104.

FIG. 5A shows an example Table_Link table 502. The Table_Link table 502 of FIG. 5A contains two defined views: (1) "Employee Salary View" and (2) "Department/Budget View". As shown in FIG. 5A, Table_Link 502 has two rows; one row used for defining the "Employee Salary View" and the other row for defining the "Department/Budget View." The view identifier (view_id) associated with the "Employee Salary View" has a value of 1 and the view identifier associated with the "Department/Budget View" has a value of 2. Consequently, each view can be uniquely identified by the view's view identifier.

The main purpose of Table_Link 502 is to link a base table from a relational database with a view. As can be seen by examining the two records contained in Table_Link 502, the Employee table 102 is linked with the "Employee Salary View" and the Department table 104 is linked with the "Department/Budget View."

FIG. 5B shows an example Table_View table 504. The Table_View table 504 shown in FIG. 5B links certain columns of the Employee table 102 with the "Employee Salary View" and certain columns of the Department table 104 with the "Department/Budget View". For example, the following columns from Employee table 102: employee_name; salary; and department_id; are linked with the view having an identifier of 1, which identifies the "Employee Salary View." Similarly, the columns department_name and department_budget of the Department table 204 are linked with the view having an identifier of 2, which identifies the "Department/Budget View."

In addition to linking fields from the base table with the view, Table_View 504 also stores the attributes of the fields that are linked with a view. For example, if one examines the third record in Table_View 504, one will see that Table_View 504 stores the attributes for the department_id field. The department_id field is a lookup filed and its corresponding lookup table is the Department table, its corresponding lookup_field is the Department.department_id field, and its corresponding display field is the Department.department_name field. All of the preceding attribute information is stored in Table_View 504.

FIG. 5C shows an example Group_View table 506. This table links views with administrative groups. As can be seen from FIG. 5C, there are three (3) defined administrative groups: admin group 1; admin group 2; and admin group 3. Also, it is apparent from FIG. 5C that the "Employee Salary View" (view_id=1) is accessible to all three administrative groups, whereas the Department/Budget View (view_id=2) is limited to administrative groups 1 and 3.

FIG. 5D shows an example Filter_Link table 502, Filter_Set table 504, and Filter_Condition table 506, where one filter has been created for the Employee Salary View (view_id=1). The filter that is stored in these tables appears as follows: (salary>50,000 AND department=engineering) OR (salary>60,000 AND department=sales). The filter is named Salary Filter, and, as can be seen from the above, the filter consists of two condition sets connected by an OR operator. Additionally, both condition sets each consist of two conditions connected by the AND operator. Consequently, as can be seen from FIG. 5D, Filter_Link 502 contains one record corresponding to the one filter that has been created. This record contains a value of 1 for the filter_id field, the name "salary filter" stored in the filter_name field, and the operator that is to link the two condition sets. In this example the OR operator is being used to connect the sets. Filter_Set 504 contains two records, one for each condition set of the filter. Filter_Condition 506 contains four records, two records for each of the two condition sets.

FIGS. 6A–B illustrate the Employee Salary View 602 and the Department/Budget View 604 as defined in the view database depicted in FIGS. 5A–5D. Employee Salary View 602 has three columns; one column for each column from the Employee table 202 that is linked with the view. The first column of Employee Salary View 602 is titled "Name of Employee", the second is titled "Salary", and the third column is titled "Department Name." These titles are stored in Table_View 504. In particular, these titles are stored in the field_title column 530 of Table_View 504.

Similarly Department/Budget View 604 has two columns corresponding to the two columns from the Department table 204 that are linked with the view in the Table_View table 504. The first column is titled "Department Name" and the second column is labeled "Budget." The contents of the Department/Budget view 604 contain a subset of the Department table 204.

The methods used by the system to create a view, display a view, and update a view will be described below with reference to FIGS. 7–9 respectively. First, however, it should be noted that the system maintains user information in a validation database so that the system can distinguish between users who have maintenance rights (e.g., administrators) and users who do not. A user must have maintenance rights to create a view.

Figure 3:
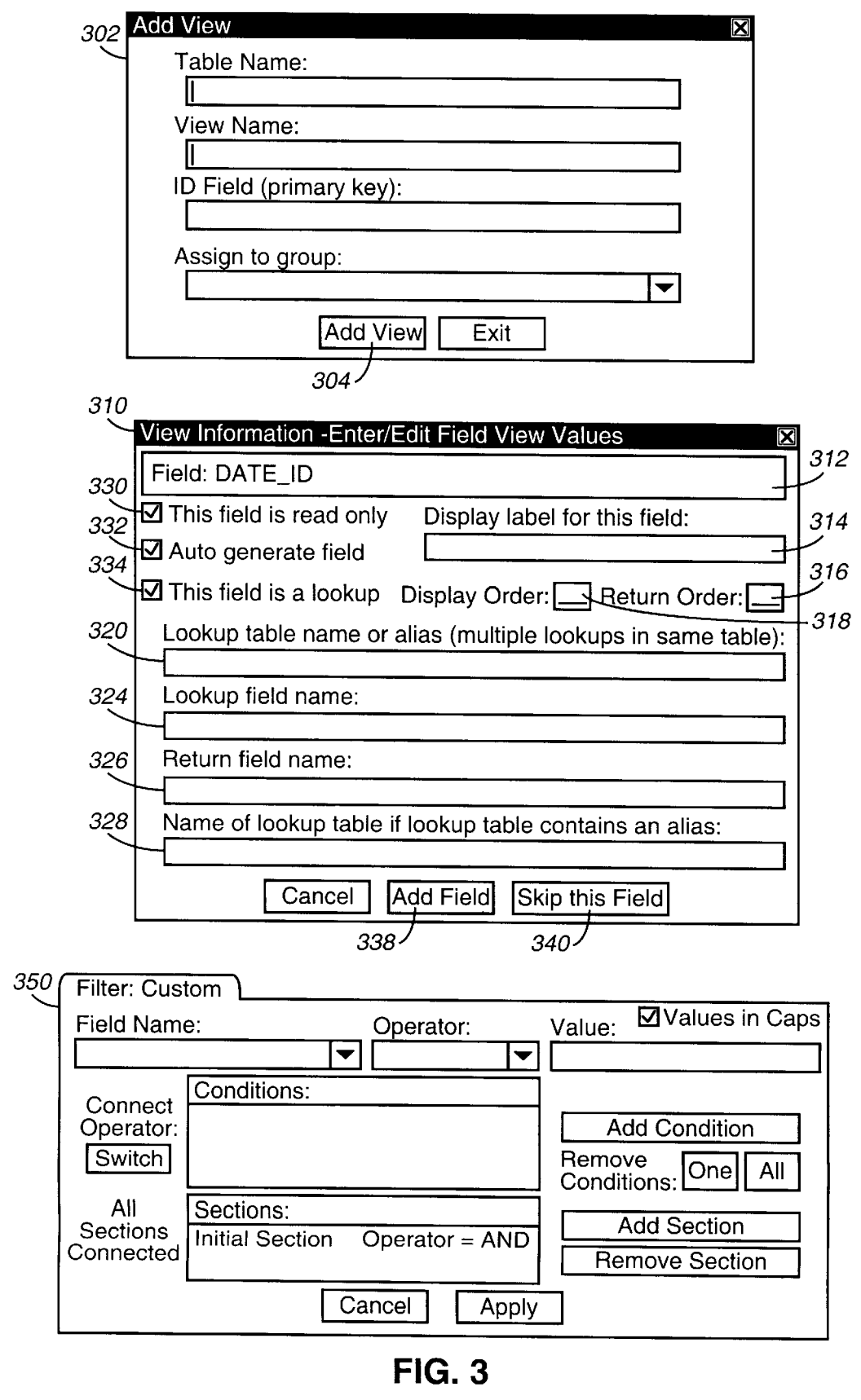
Figure 7A:
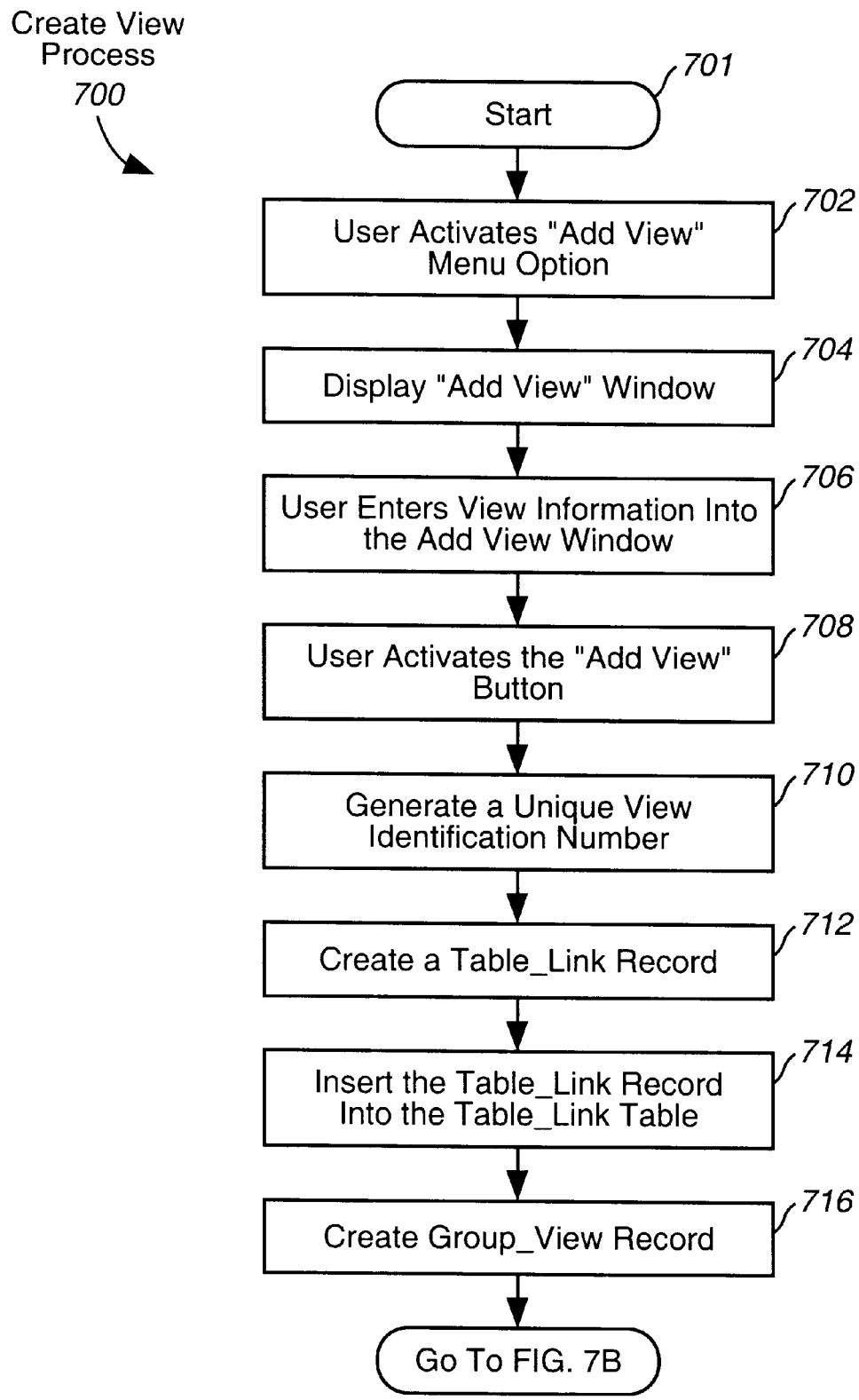
FIGS. 7A–C illustrate a process the present invention performs in creating a view.
Figure 7B:
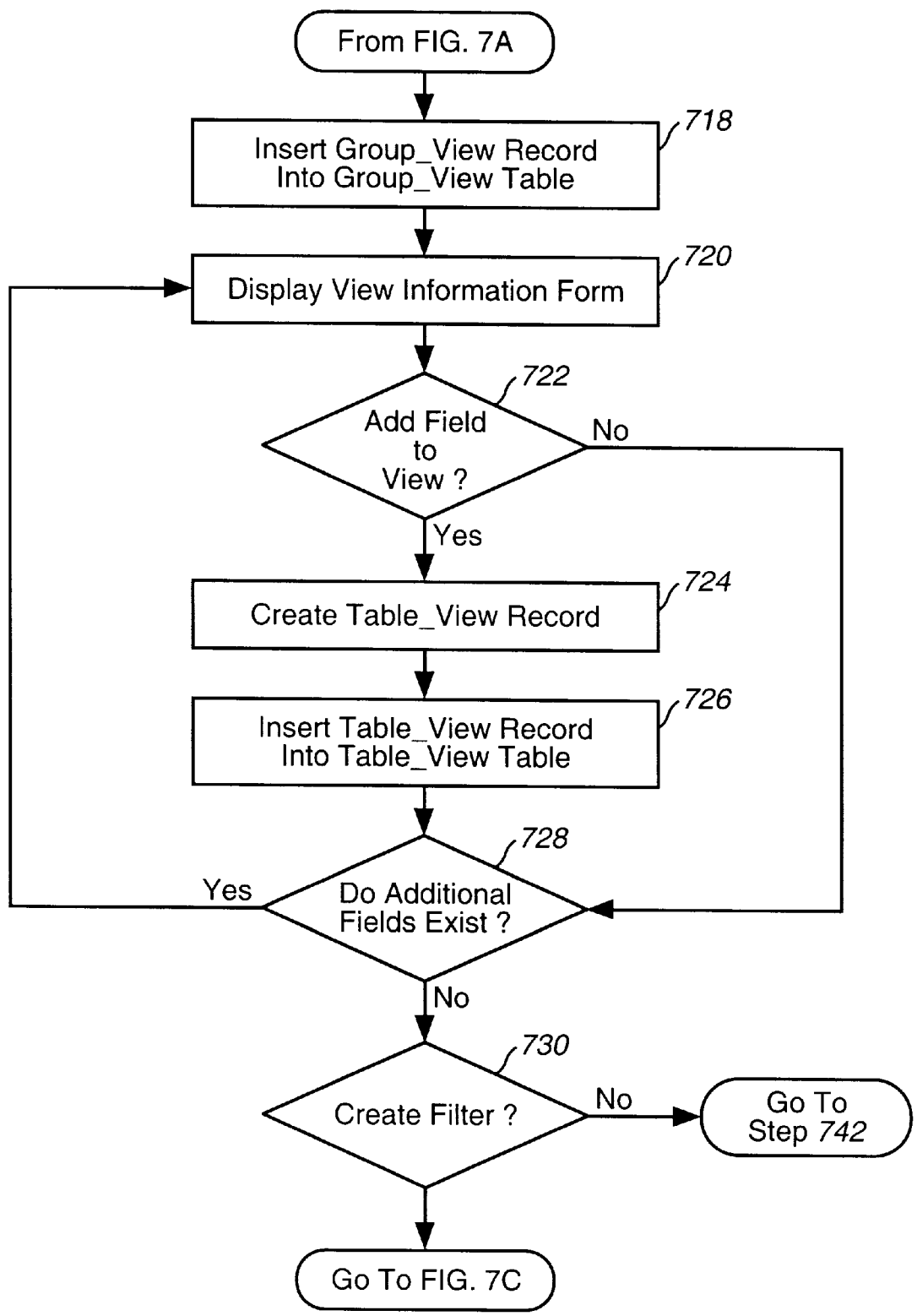
Figure 7C:
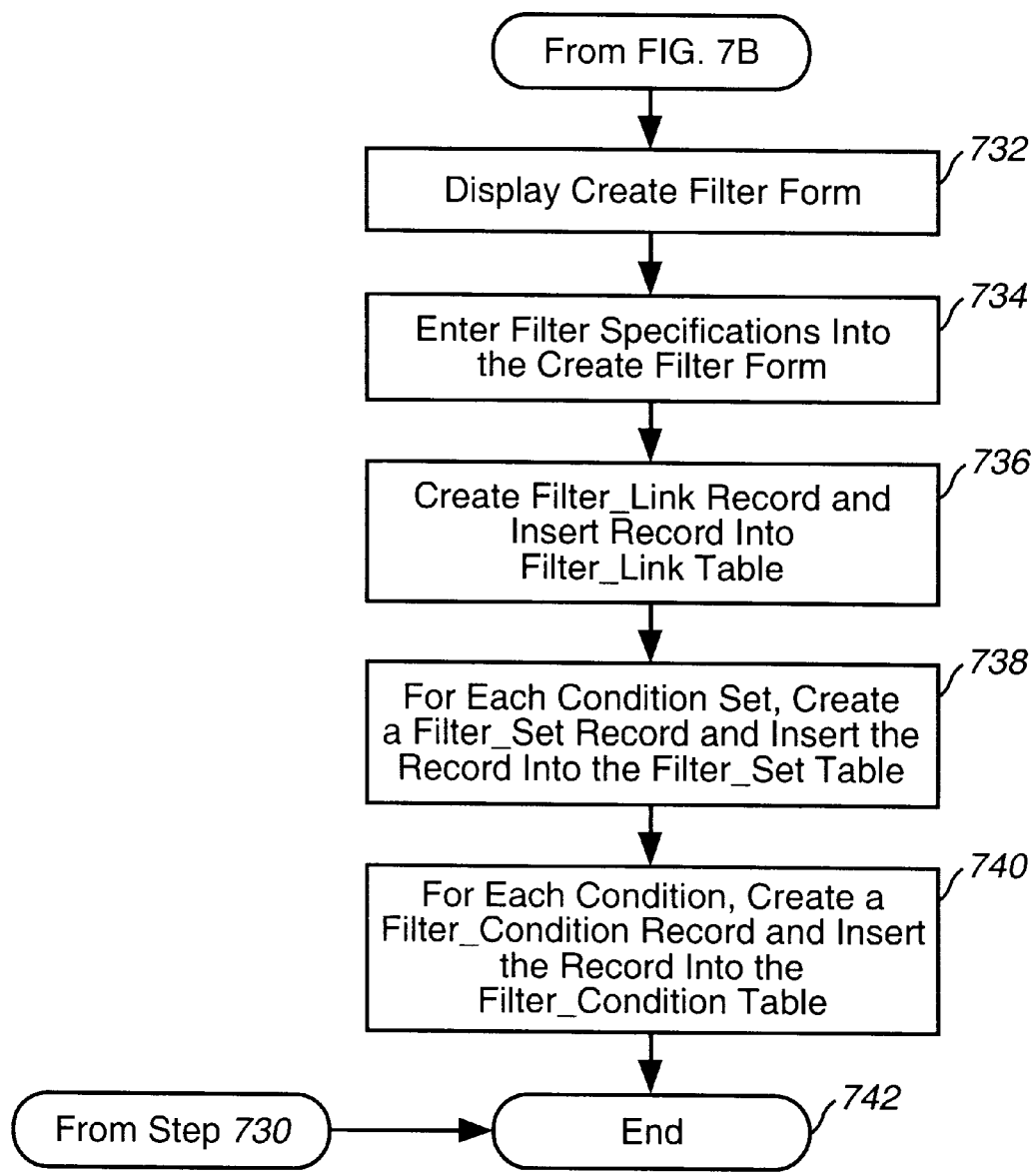
Figure 8A:
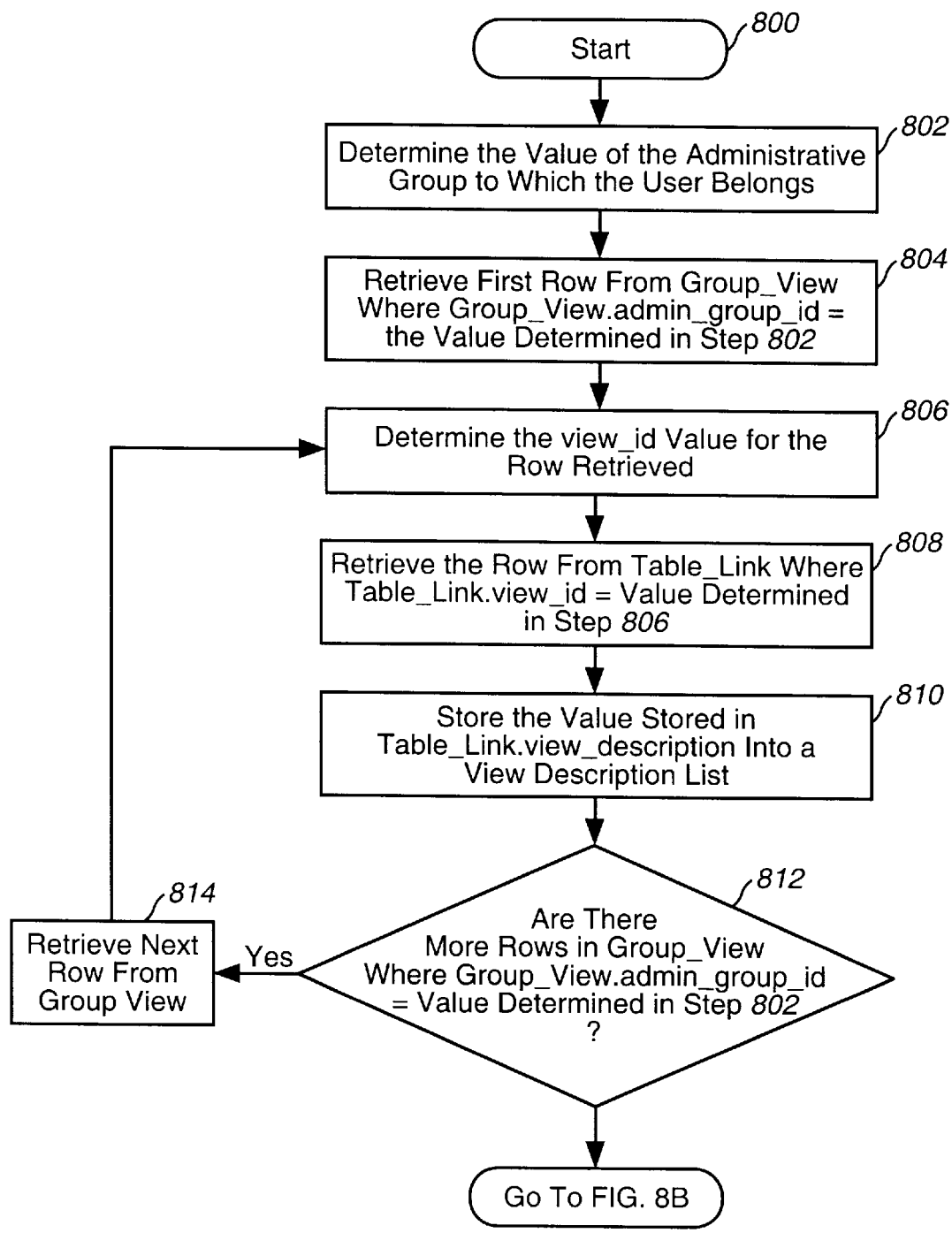
FIGS. 8A–E illustrate a process the present invention performs in displaying a view.
Figure 8B:
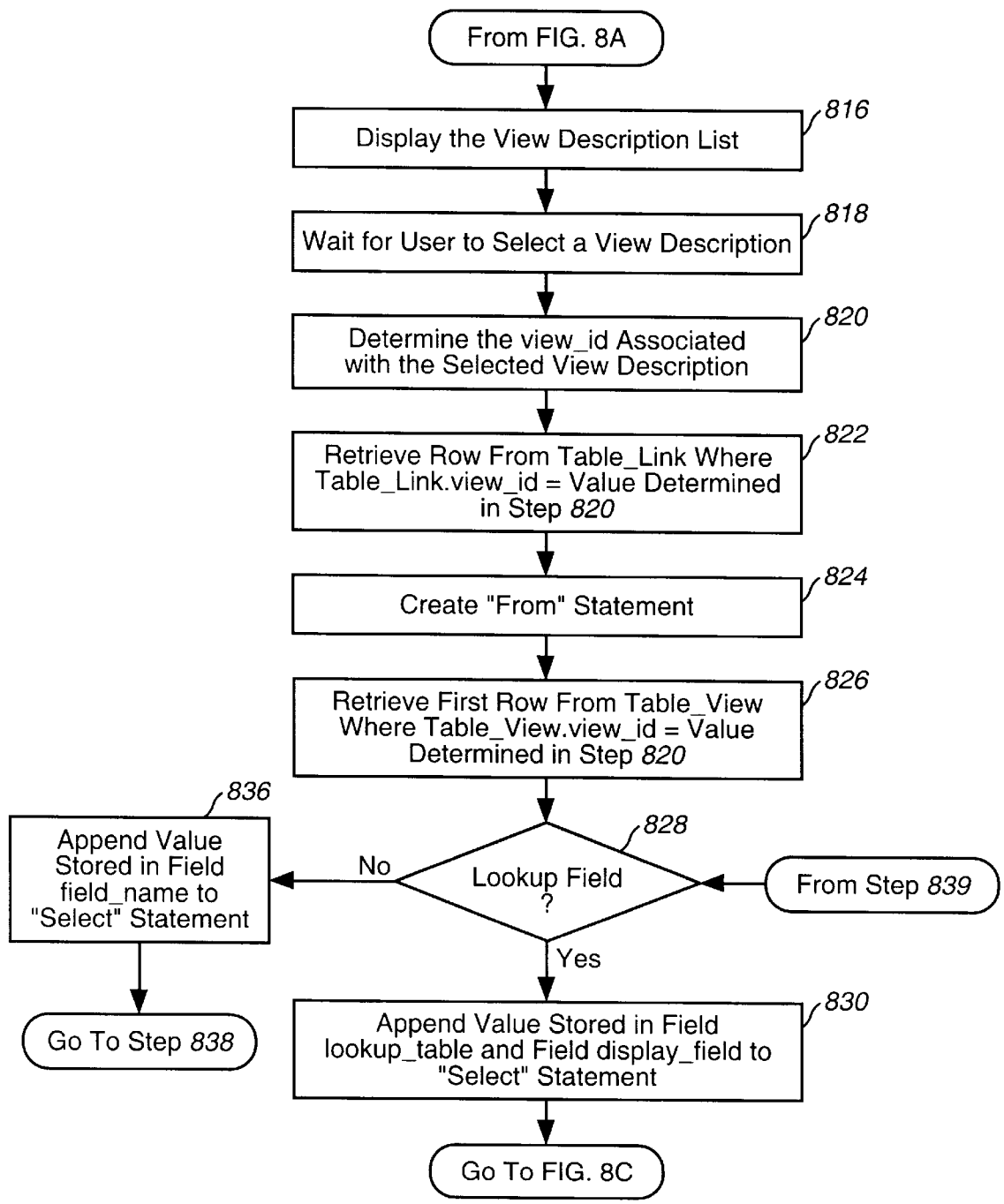
Figure 8C:
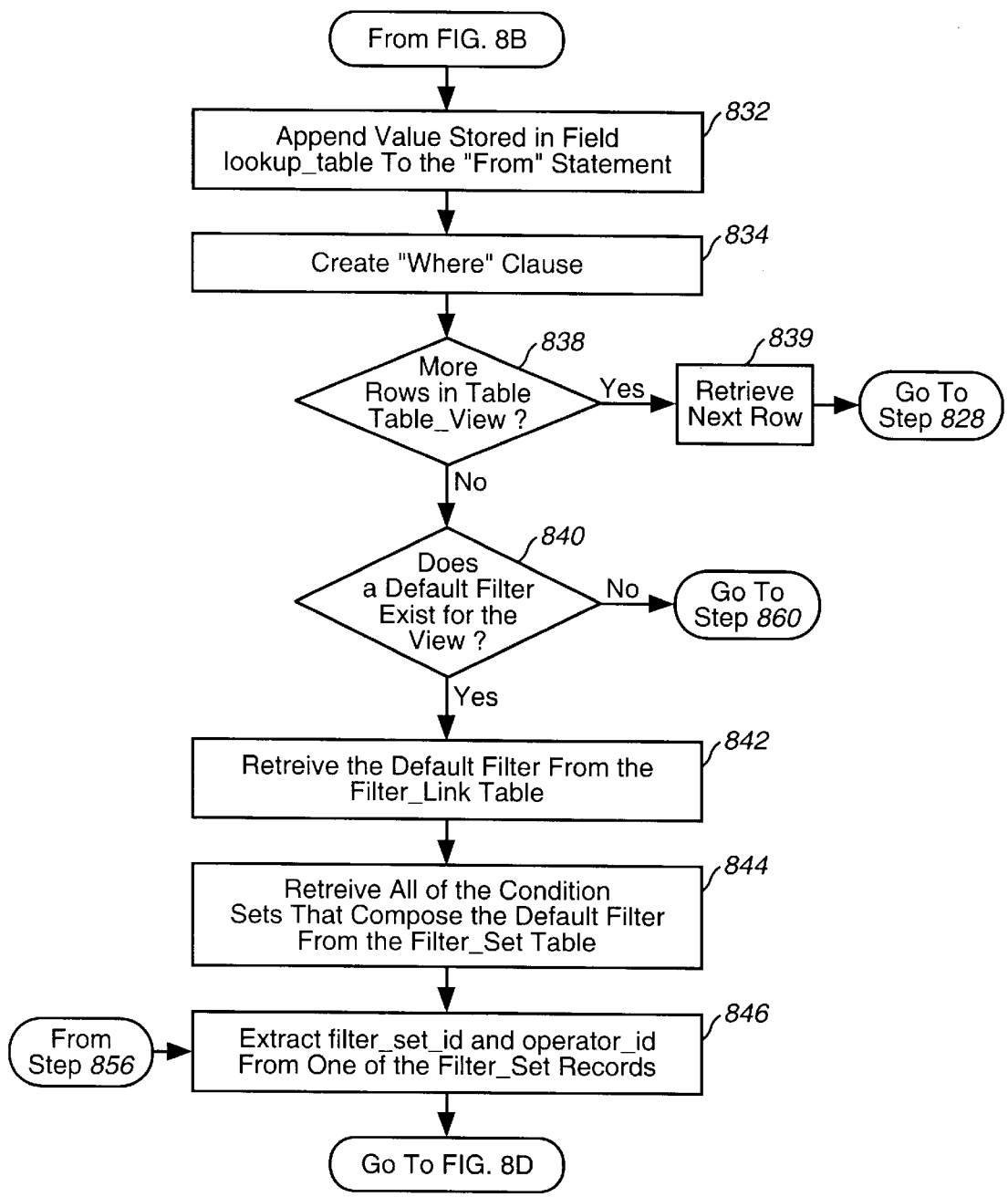
Figure 8D:
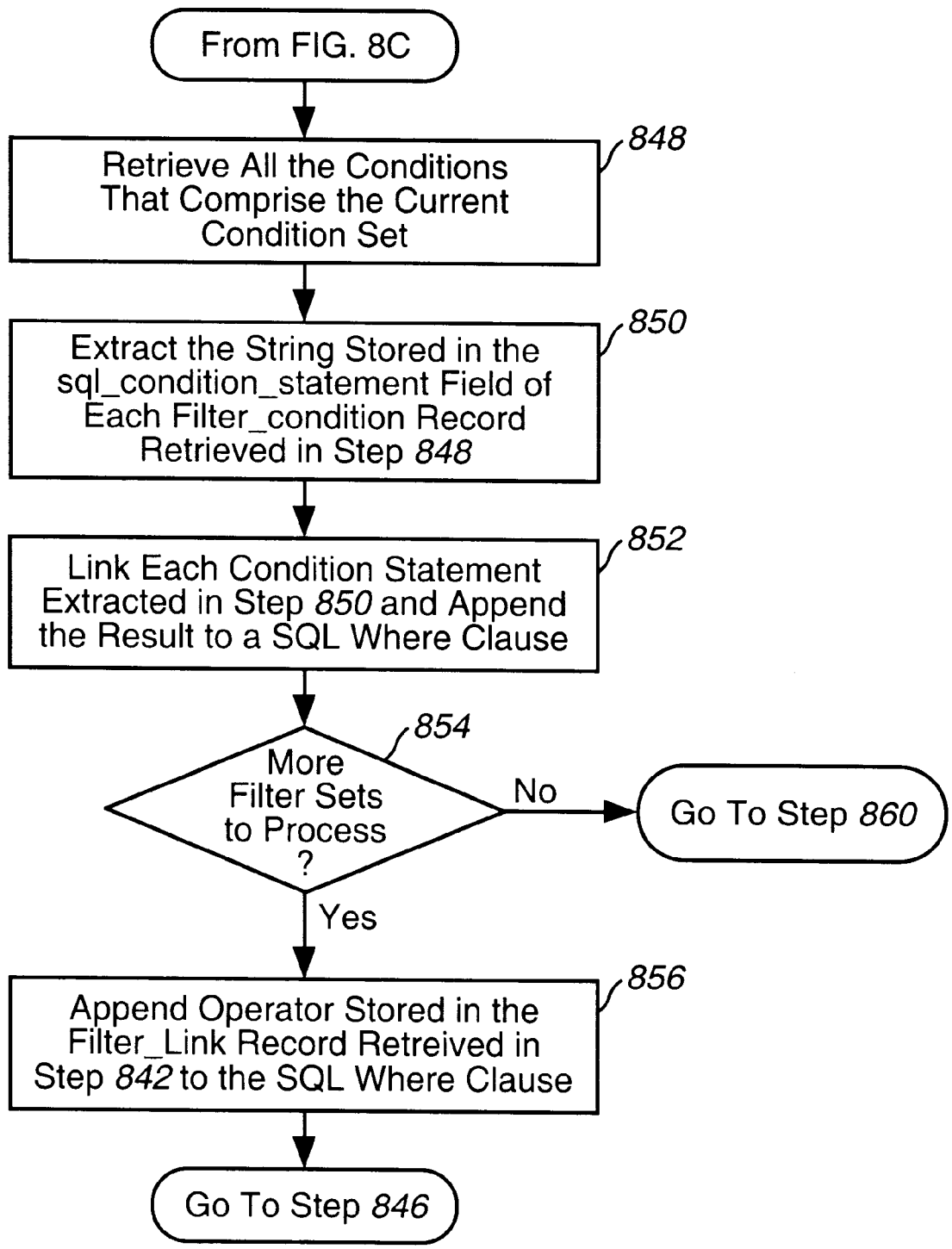
Figure 8E:
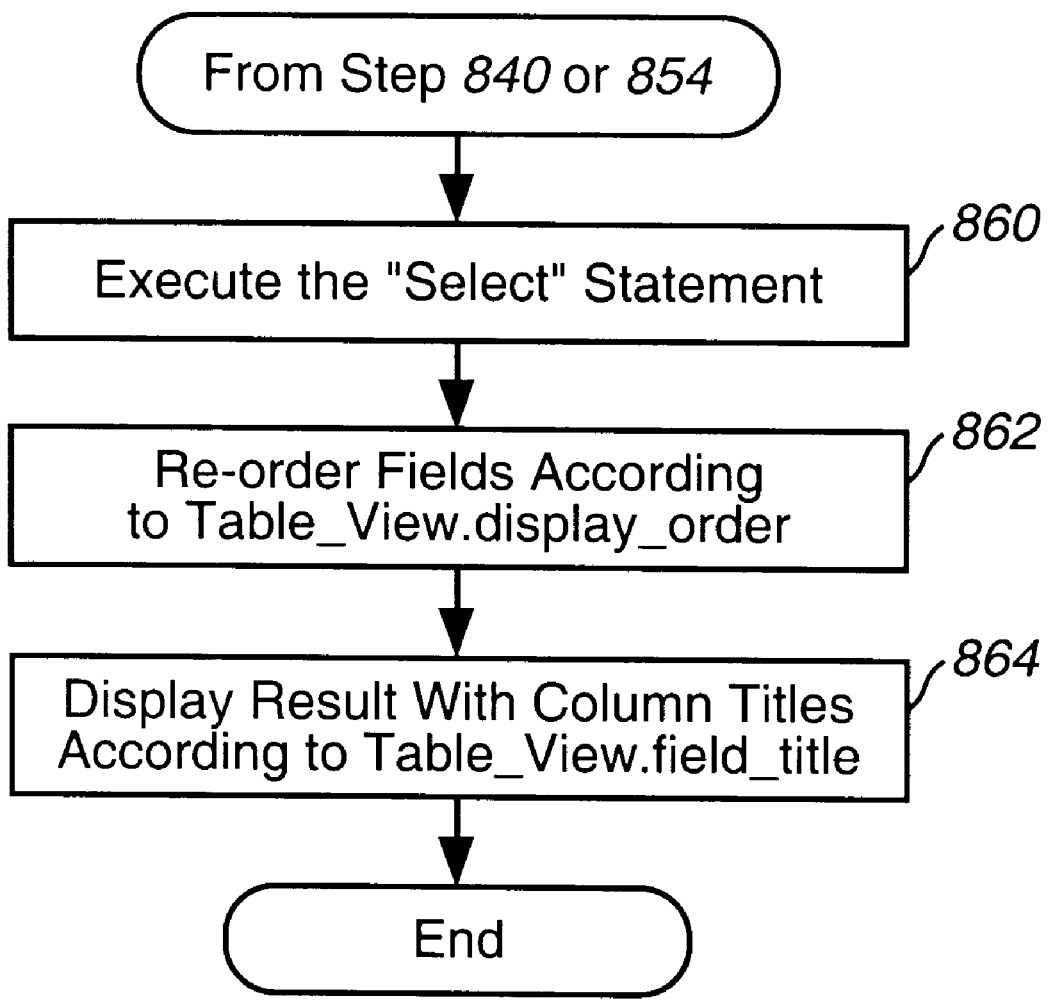

As shown in FIG. 7, the process of creating a new view begins with step 700 where control immediately passes to step 702. In step 702, the administrator will signal the utility 212 that the administrator wishes to create a new view by activating an "Add view" menu option (the add view menu option is not shown). Upon receiving the signal that the administrator wishes to add a view, the utility 212 will direct the GUI to display "Add view" window 302, which is shown in FIG. 3 (step 704). In the next step, step 706, the administrator enters the following information into the appropriate fields of Add View window 302: (a) a name for the view; (b) the name of the table that is to be the base table for the view; (c) the primary key id of the base table; and (d) the groups that will have access to the view. Once all the information has been entered into the Add view window, the administrator activates the Add view button 304 (step 708). The utility 212 will then assign a unique view identification number to the view (step 710) and, using the information provided by the administrator, will create a Table_Link 402 record, which contains the following information: view identification number, name of base table, primary key of base table, and view name (step 712). This record will then be inserted into the Table_Link table 402 by the utility 212 (step 714). Following that step, the utility 212 will generate a unique key number and create a Group_View 406 record, which contains the following information: the unique key number, the I.D. of the group that is to have access to the view, and the view identification number (step 716). This record will then be inserted into the Group_View 406 table (step 718). Additional records will be inserted into Group_View 406 if more than one group is given access to the view.

Next, utility 212 will display View Information Form 310 (step 720). The top of View Information Form 310 contains a text display area 312 where the utility displays the name of a field within the base table. The View Information Form 310 enables the administrator to specify whether the field displayed at the top of the form is to be added to the view. Additionally, the View Information form provides data input fields 314–326 and check boxes 330–334 for the administrator to specify the attributes of the field, such as: the read-only status, the lookup status, the auto-generated status, the display label for the field, and the display order of the field. Input fields 318 become active if the administrator specifies that the field is a lookup by marking check box 334.

In the next step, step 722, the administrator must decide whether to add the field displayed in the text display area 312 to the view, or skip the field. If the administrator wishes to add the field to the view, the administrator will enter data into the input fields 314–326, will activate all of the appropriate check boxes 330–334, and then activate the "Add Field" button 338. Otherwise, the administrator will simply activate the "Skip this Field" button 340.

If the administrator activates the "Add Field" button 338, control will pass to step 724, otherwise control passes to step 728. In step 724, the utility 212 will generate a unique key number and, using the information entered by the administrator, will create a Table_View 404 record, which contains the following information: the unique key number, the view identification number generated in step 710, the name of the field to be added to the view, the field's lookup status, the lookup table (if any), the lookup field (if any), the display field (if any), the field title, the read-only status, and the display order. This record will then be inserted into the Table_View table 404 by the utility 212 (step 726). Control will then pass to step 728.

In step 728, the utility 212 will determine if there are more fields in the base table to display to the administrator so that the administrator may add more fields to the view. If there are, then control will pass back to step 720 where the utility 212 will display the name of the next field within the base table in text display area 312. Otherwise, if there are no more fields in the base table to process, control passes to step 730.

In step 730, the administrator must decide whether to create filters for the view. If a administrator chooses to create a filter, control passes to step 732, otherwise control passes to step 742, where the create view process terminates.

In step 732, the utility 212 displays a Create Filter Form 350 that enables a administrator to create a filter. The next step is step 734. In step 734, the administrator interacts with the form to completely specify a filter. Specifically, the administrator interacts with the form to name the filter, create one or more condition sets, name each condition set, specify the boolean operator for connecting the condition sets, create one or more conditions for each condition set, specify the boolean operator for connecting the conditions with a condition set, and specify whether the filter should be the default filter for the view. A default view filter is a filter that is always applied to the view.

After step 734, control passes to step 736. In step 736 the utility 212 updates the Filter_Link table. In particular, the utility 212 generates a unique value for the Filter_Link.Filter_ID field, and creates a Filter_Link record using that unique value and the information entered by the administrator. Specifically, the Filter_Link record created by the utility 212 contains: (1) the unique value generated by the utility 212; (2) the filter's name specified by the administrator; (3) the view ID generated in step 710; (4) the boolean operator for connecting the condition sets that comprise the filter; and (5) the default filter status of the filter.

After step 736, control passes to step 738. In step 738, the utility 212 inserts a Filter_Set record into the Filter_Set table 456 for each condition set created by the administrator in step 734. In particular, for each condition set, the utility 212 generates a unique value for the filter_set_id field, and creates a Filter_set record using that unique value and the information entered by the administrator. Specifically, each Filter_set record created by the utility 212 contains: (1) the unique value generated by the utility 212; (2) the filter ID generated in step 736 (this is used for linking the condition set with the particular filter), (3) the name of the condition set, and (4) the boolean operator for connecting the conditions that comprise the condition set.

After step 738, control passes to step 740. In step 740, the utility 212 inserts a Filter_Condition record into the Filter_Condition table 466 for each condition created by the administrator in step 736. In particular, for each condition, the utility 212 generates a unique value for the filter_condition_id field 468, and creates a Filter_Condition record using that unique value and the information entered by the administrator. Specifically, each Filter_Condition record created by the utility 212 contains: (1) the unique value generated by the utility 212; (2) the filter set ID generated in step 738 (this is used to link the condition with the condition set to which it belongs), (3) the condition statement, (4) a table_view_id value, (5) an operator, and (4) two user defined values.

After step 740, control passes to step 742, where the process of creating a view terminates.

FIG. 8, illustrates the process of displaying a view. The process of displaying a view begins with step 800 where control immediately passes to step 802. In step 802, the utility 212 will determine the values representing the administrative groups to which the user belongs. A security database (not shown) contains this information. In particular, the utility 212 will receive a user name and password from a user, and then will then access a security database to verify the user based on the username/password combination. The security database contains a user profile, which, among other things, specifies the administrative group(s) to which the user belongs.

In the next step (step 804), the utility 212 will retrieve the first row from Group_View 406 where Group_View.admin_group_id 438 equals one of the values determined in step 802. The next step, step 806, determines the value stored in the Group_View.view_id field 440 of the row retrieved in step 804. After step 806, control passes to step 808. In step 808, the utility 212 will retrieve the row from Table_Link 402 where Table_Link.view_id 408 equals the value determined in step 806. Control then passes to step 810. In step 810, the utility 212 will store the value stored in the Table_Link.view_description field 414 of the row retrieved in step 808 into a view description list.

After step 810, control passes to step 812. In step 812, the utility 212 will determine whether there are more rows in Group_View 406 where Group_View.admin_group_id 438 equals one of the values determined in step 802. If there are more such rows, control passes to step 814, otherwise control passes to step 816. In step 814, the utility 212 will retrieve the next row from Group_View 406 where Group_View.view_id 440 equals one of the values determined in step 802. After step 814 control passes back to step 806.

In step 816, the utility 212 will display the view description list to the user. The view description list contains all of the views to which the user has been assigned. Because these are the only views that the user will see, the user will have access only to those views to which the user has been assigned. This provides a mechanism for allowing each user to have their own unique views of the database.

After step 816, control passes to step 818. In step 818, the utility 212 will wait for the user to select one of the view descriptions that was displayed in step 816. After the user makes his or her selection, the utility 212 will determine the view identifier associated with the view description that was chosen by the user (step 820). Next, step 822, the utility 212 will retrieve the row from Table_Link 402 where Table_Link.view_id 408 equals the view id determined in step 820. After step 822 is performed, control passes to step 824. In step 824, the utility 212 will append the information stored in the Table_Link.table_name field 410 of the row retrieved in step 822 to a SQL "from" statement, whereby the "from" statement will have the following form: "from <name of table associated with the view>".

After step 824, control passes to step 826. In step 826, the utility 212 will retrieve the first row from Table_View 404 where Table_View.view_id 416 equals the value determined in step 820. Next, step 828, the utility 212 will determine if the row retrieved from Table_View 404 in step 826 contains a lookup field. If it does contain a lookup field, control passes to step 830, otherwise control passes to step 836.

In step 836 the utility 212 will append the value stored in the fields Table_Link.table_name 410 and Table_View.field_name 420 to a SQL "select" statement, whereby the select statement will have the following form: "Select <name of table>.<name of field>". After step 836, control passes to step 838.

In step 830, the utility 212 will append the information stored in the Table_View.lookup_table 424 and Table_View.display_field 428 field of the row retrieved in step 826 to a SQL "select" statement, whereby the SQL select statement will have the following form: "Select <name of table>.<name of field>".

After step 830, control proceeds to step 832. In step 832, the utility 212 will append the information stored in the Table_View.lookup_table field of the row retrieved in step 826 to the SQL "from" statement of step 824. The "from" statement will now have the form: "from <name of table associated with the view>, <name of a lookup table>, . . . ."

Step 834 is executed following step 832. In step 834, the utility 212 will append the information stored in Table_Link.table_name, Table_View.field_name, Table_View.lookup_table, and Table_View.lookup_field to a SQL, "where" clause, whereby the "where" clause will have the following form: Where <table_name1>.<field_name1>=<table_name2>.<field_name2>". Table_name1 corresponds to Table_Link.table_name; field_name1 corresponds to Table_View.field_name; table_name2 corresponds to Table_View.lookup_table; and field_name2 corresponds to Table_View.lookup_field.

After step 834, control passes to step 838. In step 838, the utility 212 will determine if there are more rows in Table_View 404 where Table_View.view_id 418 equals the value determined in step 820. If there are more rows, then control passes to step 839 where the utility 212 will retrieve the next row where Table_View.view_id 418 equal the value determined in step 820. Control will then go back to step 828. If there are no more such rows, then control will pass to step 840.

In step 840, the utility 212 will examine the record from the Table_Link table 402 that was retrieved in step 822 to determine if a default filter exists for this view. If default filter exists, then control passes to step 842, otherwise control passes to step 860. In step 842, the utility 212 will retrieve the record from the Filter_Link table 444 where Filter_Link.filter_id 446 equals the value stored in the default_filter_id field 411 of the record from Table_Link 402 that was retrieved in step 822. That Filter_Link record will contain the filter name of the default filter, a filter id, and an operator value for connecting the condition sets that comprise the filter. Next, in step 844, the utility 212 will retrieve all the records from Filter_Set 456 where Filter_Set.filter_id 460 equals the filter id of the default filter. Those records define all of the condition sets that comprise the default filter.

Next, in step 846, the utility 212 will process one of the Filter_Set records that were retrieved in step 844, which will be called the current condition set, by extracting the filter set id and the operator_id from that record. Then, in step 848, the utility 212 will retrieve all records from Filter_Condition 466 where Filter_Condition.filter_set_id 470 equals the extracted filter set id. Those records contain the entire set of conditions that comprise the current condition set. Next, step 850, the utility 212 will extract the condition stored in the sql_condition_statement field 472 of each Filter_Condition record. Then, in step 852, it will link each condition statement using the operator_id 464 that was extracted from the current Filter_Set record and take that result and append it to the SQL Where clause created in step 834, if that step was executed, or it will create a Where clause with that result.

Next, in step 854, the utility 212 will determine if there are more Filter_Set records to process. If there are, control passes to step 856, otherwise control passes to step 860. In step 856, the utility 212 will append the operator stored in the record retrieved in step 842 to the SQL Where clause. Control then passes back to step 846.

In step 860, the utility 212 will execute the SQL Select From Where statement that was created in steps 824, 830, 832, 834, 836, and 852. For example, assuming the user selected to view the "Employee Salary View," then the SQL "Select From Where" statement would appear as follows:

Select Employee.employee_name, Employee.salary, Department.department_name
From Employee, Department
Where Employee.department_id= Department.department_id AND
(Employee.salary>$50,000 AND Department.name= engineering) OR
(Employee.salary>$60,000 AND Department.name= sales).

After the SQL command is executed in step 860, control passes to step 862. In step 862, the utility 212 will reorder the result of the SQL command so that the fields will be ordered in accordance with the Table_View.display_order field 434. Next, the utility 212 will display the re-ordered table and will display column headings in accordance with Table_View.field_title 430 (step 864). The process for displaying a view terminates after step 864.

Since the utility 212 uses the above procedure for creating the SQL statement for accessing a relational database, the user need not be proficient in SQL to view only the portions of the database that are of interest to the user. In fact, the user need not know anything about SQL, the user need only know how to operate the GUI, which is controlled by utility 212, to select a desired view that has been saved to the view database 214. Consequently, the invention described above allows a user to effortlessly view only the portions of a relational database that the user has an interest in viewing.

Figure 9:
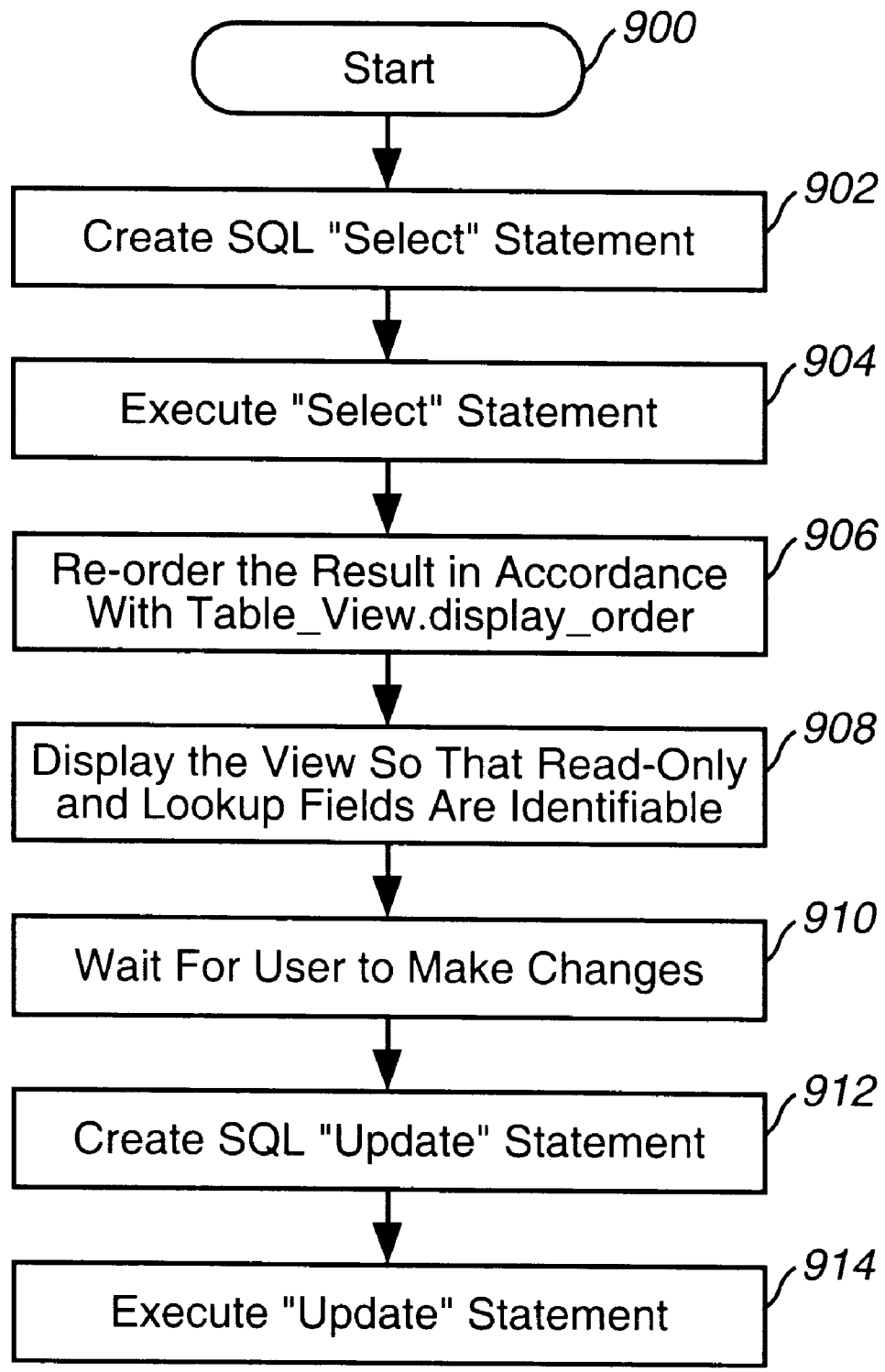
FIG. 9 illustrates a process the present invention performs in updating a view.
Figure 10:
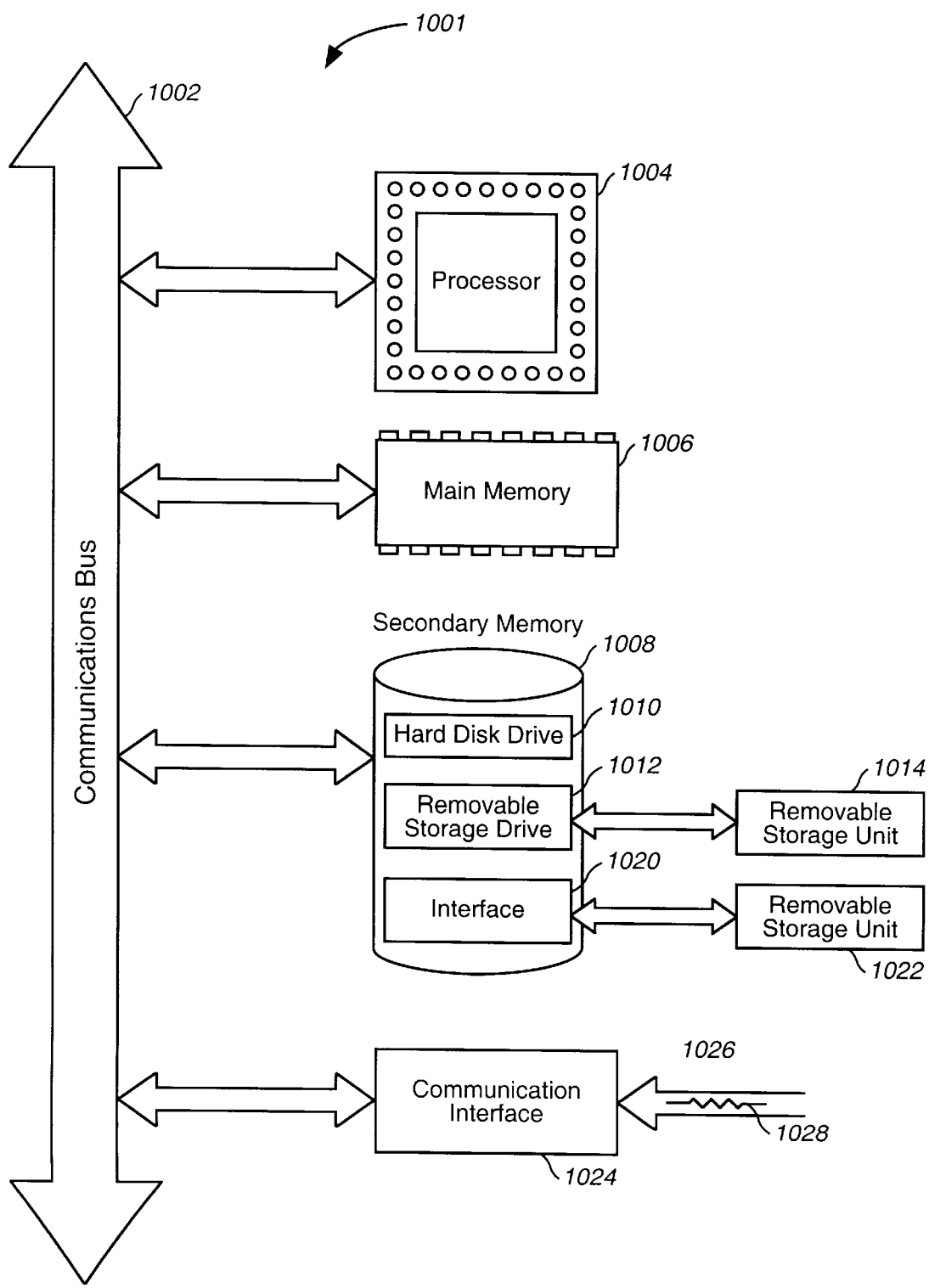
FIG. 10 illustrates an example computer system that can be installed with the present invention.

FIG. 9 illustrates the process the utility 212 performs when a user wants to modify the database by changing a row(s) in a view. The process begins at step 900 where control immediately passes to step 902. In step 902, the utility 212 will create a SQL "Select from where" statement in accordance with the process of FIG. 8, with the exception that an additional column is retrieved from the table associated with the view. The additional column selected from the table is the primary key of the table. For example, assuming the user is modifying the Employee Salary View, then the Select statement would appear as follows:

Select Employee.employee_name, Employee.title, Department.department_name, Employee.employee_id
From Employee, Department
Where Employee.department_id= Department.department_id AND
(Employee.salary>$50,000 AND Department.name= engineering) OR
(Employee.salary>$60.000 AND Department.name= sales).

This select statement is identical with the one produced by the process of FIG. 8, with one exception: the Employee.employee_id field, which is the primary key of the Employee table, has been added to the select clause. The reason the primary key field must be selected is that it must be used in a Where clause of a subsequent SQL Update statement, as will be described in more detail below.

After step 902, control passes to step 904. In step 904, the utility 212 will execute the SQL statement created in step 902. After step 904 is executed, control passes to step 906. In step 906, the utility 212 will reorder the result of the SQL command so that the fields will be ordered in accordance with the Table_View.display_order field 434.

Next, in step 908, the utility 212 will display the re-ordered table and display column headings in accordance with Table_View.field_title 430. In addition, the result will be displayed in such a manner that fields that are read-only and fields that are lookup fields will be identifiable.

For example, the fields that are read-only will be displayed using the color red, the fields that are lookup fields will be displayed in blue, and all other fields will be displayed in black. Further, the view will be displayed in a window that allows the user to edit the fields that are displayed in black (i.e., the non read-only fields). For the fields displayed in blue (i.e., the lookup fields), if the user selects such a field by clicking the mouse button while the mouse pointer is within the display area of such a field, then a list of all the valid entries for that field will be displayed and the user can select from that list to modify that field. Utility 212 creates the list of valid entries by retrieving data from the lookup table that corresponds to the lookup field selected by the user. In this way, a user can modify a table that contains a lookup field without the user having to perform a lookup of the lookup table since the utility performs that task for the user. Consequently, the invention allows a user who may be unfamiliar with SQL and the structure of the base tables to effortlessly modify the database.

After step 908, control passes to step 910. In step 910, the utility 212 will wait for the user to send an update signal to the utility 212, wherein the update signal indicates that the user has made all of his or her desired changes. Upon receiving the update signal, control passes to step 912. In step 912, the utility 212 will create a SQL Update statement for each row in the view that has been modified. Each update statement will have the following form:

Update "table"
set "field1"=value, "field2"=value, . . . , "fieldN"=value
where "table.primary_key"=value of primary key for row "Table" is the name of the table associated with the view being modified. This table name is stored in Table_Link.table_name 410. "FieldN" is the name of a field within table that has been modified (this is stored in table_view.field_name 420); and "table.primary_key" is the primary key field of the table associated with the view that the user is modifying (this value is stored in Table_Link.primary_key 412).

For example, assuming a user wants to change the Employee Salary View to reflect the fact that the employee named John, whose employee_id is 1, has transferred from the engineering department to the marketing department, then, in accordance with the present invention, the utility 212 will create the following SQL Update statement:

(1) update "Employee"
set "department_id"=200
where "Employe.employee_id"=1

Note that, upon the user changing the department name stored in the Department Name field of the Employee Salary View from "Engineering" to "Marketing," the utility automatically sets the Employee.department_id field to the value of 200, which is the department ID associated with the marketing department. Consequently, a database user does not need to learn all of the department IDs associated with each department name because the utility 212 has program logic for mapping department names to department IDs. In short, the problem introduced by utilizing lookup fields, which was described in the background section, is solved because a user need not access the Department table 104 in order to modify Employee table 102. Instead, the user need only modify the view that is associated with the Employee table 102 since the utility will take those view modifications made by the user and automatically translate them into the appropriate SQL commands, which will cause the appropriate changes to be made in the actual database tables.

After step 912, control passes to step 914. In step 914, the utility 212 will execute the SQL, statements created in step 912. After step 914 is executed the update process terminates.

According to another alternative embodiment of the present invention, the present invention represents a computer program product that includes a computer readable medium having computer program logic recorded thereon. The computer program logic enables a computer system to create, display, and update views of tables of a relational database.

The present invention may be implemented using hardware, software or a combination thereof and may be implemented in a computer system or other processing system. An example computer system 1001, which can be installed with the present invention, is shown in FIG. 10. The computer system 1001 includes one or more processors, such as processor 1004. The processor 1004 is connected to a communication bus 1002. Various software embodiments are described in terms of this example computer system. After reading this description, it will become apparent to a person skilled in the relevant art how to implement the invention using other computer systems and/or computer architectures.

Computer system 1002 also includes a main memory 1006, preferably random access memory (RAM), and can also include a secondary memory 1008. The secondary memory 1008 can include, for example, a hard disk drive 1010 and/or a removable storage drive 1012, representing a floppy disk drive, a magnetic tape drive, an optical disk drive, or the like. The removable storage drive 1012 reads from and/or writes to a removable storage unit 1014 in a well known manner. Removable storage unit 1014, represents a floppy disk, magnetic tape, optical disk, or the like, which is read by and written to by removable storage drive 1012. As will be appreciated, the removable storage unit 1014 is a computer usable storage medium having stored therein computer software and/or data.

In alternative embodiments, secondary memory 1008 may include other similar means for allowing computer programs or other instructions to be loaded into computer system 1001. Such means can include, for example, a removable storage unit 1022 and an interface 1020. Examples of such can include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1001.

Computer system 1001 can also include a communications interface 1024. Communications interface 1024 allows software and data to be transferred between computer system 1001 and external devices. Examples of communications interface 1024 can include a modem, a network interface (such as an Ethernet card), a communications port, a PCMCIA slot and card, etc. Software and data transferred via communications interface 1024 are in the form of signals which can be electronic, electromagnetic, optical or other signals capable of being received by communications interface 1024. These signals 1026 are provided to communications interface via a channel 1028. This channel 1028 carries signals 1026 and can be implemented using wire or cable, fiber optics, a phone line, a cellular phone link, an RF link and other communications channels.

In this document, the terms "computer program medium" and "computer usable medium" are used to generally refer to media such as removable storage device 1012, a hard disk installed in hard disk drive 1010, and signals 1026. These computer program products are means for providing software to computer system 1001.

Computer programs (also called computer control logic) are stored in main memory and/or secondary memory 1008. Computer programs can also be received via communications interface 1024. Such computer programs, when executed, enable the computer system 1001 to perform the features of the present invention as discussed herein. In particular, the computer programs, when executed, enable the processor 1004 to perform the features of the present invention. Accordingly, such computer programs represent controllers of the computer system 1001.

In an embodiment where the invention is implemented using software, the software may be stored in a computer program product and loaded into computer system 1001 using removable storage drive 1012, hard drive 1010 or communications interface 1024. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

What is claimed is:

1. A system for creating views of data stored in a relational database, comprising:

a view database for storing one or more views; and a view utility;

said view utility having access to said view database and the relational database; wherein said view utility comprises:

a graphical user interface for enabling the user to interact with said view utility;

view creation window for creating one or more views, wherein a user inputs data to be displayed by the one or more views in fields of said window; and storing means for storing said one or more views in said view database.

2. The system of claim 1, wherein said view database includes assigning means for assigning the user to a set of views, wherein the user will have access only to said set of assigned views.

3. The system of claim 2, wherein said view utility further comprises:

selecting means for enabling the user to select a view from among only said set of assigned views; and retrieving means for retrieving data from the relational database corresponding to said selected view.

4. The system of claim 3, wherein said selecting means includes a graphical user interface window for displaying a list of view descriptions corresponding to said set of assigned views.

5. The system of claim 3, wherein said retrieving means includes a database command generator for creating a database command to retrieve data from the relational database corresponding to said selected view.

6. The system of claim 1, wherein said view creation means includes a graphical user interface display screen for enabling said view utility to receive view information from an administrator, wherein said view information defines a view.

7. The system of claim 6, wherein said view information includes:

a name of a table within the relational database; and a view name.

8. The system of claim 7, wherein said view information further includes a filter specification.

9. The system of claim 8, wherein said view information further includes a name of a field within said table and the attributes of said field.

10. The system of claim 9, wherein said attributes of said field include said field's read-only status.

11. The system of claim 10, wherein said attributes of said field further include a lookup table, a lookup field, and a display field if said field is a look up field.

12. The system of claim 1, wherein said view database is a relational database.

13. The system of claim 12, wherein said view database comprises a table for linking a name of a table within the relational database with a view identifier.

14. The system of claim 12, wherein said view database comprises a table for linking a field of a table within the relational database with a view identifier.

15. The system of claim 12, wherein said view database comprises a table for linking a filter with a view identifier.

16. A method for creating a view of a relational database, comprising the steps of:

generating a view identifier to identify the view;

displaying a window requesting input of a table to associate with the view identifier;

receiving input of a table to associate with the view identifier;

associating said table within the relational database with said view identifier;

displaying a window requesting input of one or more fields in said table to associate with the view identifier;

receiving input of one or more fields of said table to associate with the view identifier;

associating one or more fields of said table with said view identifier;

determining which of said fields are lookup fields; and for each of said lookup fields, associating a corresponding lookup table, lookup field and display field with said lookup field.

17. The method of claim 16, further comprising the step of associating a filter with said view identifier.

18. The method of claim 16, further comprising the step of associating a read-only status with each of said one or more fields associated with said view identifier.

19. In a system having a view database that stores a plurality of views, a method for enabling a user unfamiliar with relational database commands to display data that is stored in a relational database, comprising the steps of:

determining which of the plurality of views are assigned to the user;

displaying a list of view descriptions corresponding to said views assigned to the user;

waiting for the user to select a view description from among said list of displayed view descriptions;

creating a database command corresponding to said selected view description; and executing said command.

* * * * *